United States Patent [19]
Nishikawa et al.

[11] Patent Number: 5,109,255
[45] Date of Patent: Apr. 28, 1992

[54] TEMPERATURE CONTROL SYSTEM

[75] Inventors: Tomoyuki Nishikawa, Matsudo; Masahiro Kita, Tokyo; Takaaki Yano, Kawagoe; Tatsuya Yoshida, Shimooshi; Ryoji Honda, Asaka; Kiyoshi Negishi, Tsurugashima; Tsutomu Sato, Tokyo; Shoji Kamasako, Tsurugashima, all of Japan

[73] Assignee: Asahi Kogaku Kogyo Kabushiki Kaisha, Tokyo, Japan

[21] Appl. No.: 612,084

[22] Filed: Nov. 13, 1990

[30] Foreign Application Priority Data

Nov. 10, 1989 [JP] Japan .................... 1-293712
Apr. 11, 1990 [JP] Japan .................... 2-98221

[51] Int. Cl.⁵ .......................................... G03G 15/20
[52] U.S. Cl. ................... 355/285; 219/216; 355/208
[58] Field of Search ........... 355/285, 282, 208, 290; 219/469, 470, 471, 216; 432/60; 118/60

[56] References Cited

U.S. PATENT DOCUMENTS

| | | | |
|---|---|---|---|
| 3,909,258 | 9/1975 | Kotz . | |
| 4,144,835 | 3/1979 | Fukase et al. | 219/216 X |
| 4,480,908 | 11/1984 | Anzai et al. | 355/285 |
| 4,538,902 | 9/1985 | Inuzuka et al. | 219/216 X |
| 4,556,779 | 12/1985 | Hashimoto et al. | 432/60 X |
| 4,640,880 | 2/1987 | Kawanishi et al. . | |
| 4,660,759 | 4/1987 | Barnard et al. . | |
| 4,706,882 | 11/1987 | Barnard . | |

FOREIGN PATENT DOCUMENTS

| | | | |
|---|---|---|---|
| 53-82420 | 7/1978 | Japan | 355/208 |
| 58-174978 | 10/1983 | Japan | 355/208 |
| 62-217255 | 9/1987 | Japan . | |
| 63-187275 | 8/1988 | Japan | 355/208 |

Primary Examiner—A. T. Grimley
Assistant Examiner—Shuk Y. Lee
Attorney, Agent, or Firm—Sandler, Greenblum & Bernstein

[57] ABSTRACT

A temperature control system is employed in a electrophotographic printer for controlling the temperature of a heat roller. In the system, the temperature of the heat roller is kept in a predetermined range of an operable range when printing is executed, and kept in a predetermined range of a standby range, which is lower than the operable range, when printing is unexecuted. The temperature of the heat roller is controlled to be raised up to the upper limit of the operable range before it is changed to be in the standby range when printing is terminated.

13 Claims, 10 Drawing Sheets

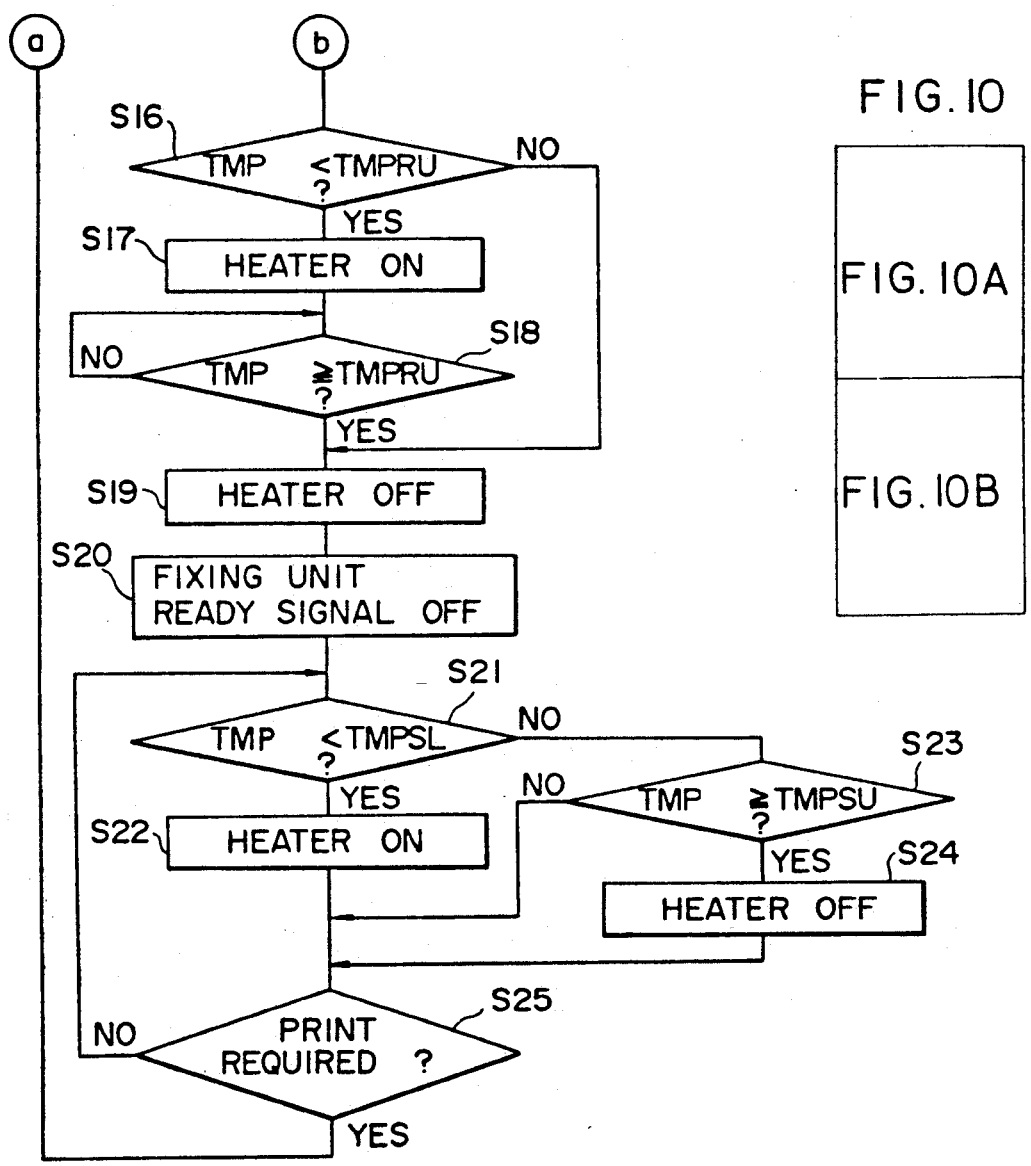

TEMPERATURE CONTROL SYSTEM

BACKGROUND OF THE INVENTION

The present invention relates to a temperature control system for controlling the temperature of a heat roller provided in a printer employing an electrophotographic image transfer system.

The printer employing an electrophotographic image transfer system includes an exposure step for forming an electrostatic latent image on the circumferential surface of a photoreceptor drum, a developing step for adhering toner to the electrostatic latent image, a transfer step for transferring the toner image to a recording sheet, and a fixing step for fixing the toner image thus transferred to the recording sheet.

As the fixing means, a mechanism is generally employed for feeding the recording sheet between a heat roller heated to a high temperature and an oppositely arranged press roller, so as to fix the toner image to the recording sheet by thermocompression adhesion.

The heat roller is heated by a heat source such as a halogen lamp provided therein. In the case of a printer, for instance, the lamp is controlled so that a high fixing temperature is used only during the time when data is transmitted from a host computer, whereas a low standby temperature is used when no data exists after printing is terminated, in order to save electric power or suppress a temperature rise in the printer.

Since the aforementioned temperature control is performed within a range of 10 degrees, however, the actual heat roller temperature varies within the range.

When a certain period of time has elapsed after printing is terminated and the fixing temperature is lowered to the standby temperature, there occurs a difference between the temperature in cases where the upper limit of the fixing temperature is employed as a start point and where the lower limit thereof is used as a start point.

If, however, the temperature is lowered to the standby temperature a long time after it is switched to the standby temperature, warm-up time is unaffected in either case (i.e. upper or lower limit as start point) when the temperature is lowered.

When the switching of the fixing condition of the heat roller to the standby condition thereof is frequently made as in a case where data is transmitted to the printer intermittently, that is, when the temperature is raised again before it reaches the standby temperature, a problems arises in that long warm-up time is needed, when the lower limit of the fixing temperature is set as the start point at the time the temperature is lowered.

SUMMARY OF THE INVENTION

It is therefore an object of the invention to provide an improved temperature control unit capable of making warm-up time as short as possible when the temperature is raised again after the temperature has been lowered from a fixing temperature to a standby temperature.

For the above object, according to the invention, there is provided a temperature control system employed in a electrophotographic printer for controlling the temperature of a heat roller.

The control system includes a switching mechanism for switching the setting of the temperature of the heat roller between an operable range and a standby range, the temperature of the heat roller being held in the operable range when printing is executed, while the temperature of the heat roller is held in the standby range, which is lower than the operable range, when printing is not executed.

A selection mechanism for selecting one of the operable range and the standby range; and control mechanism for raising the temperature of the heat roller to the upper limit of the operable range before the temperature of the heat roller is lowered to the standby range when the standby range is selected by the select mechanism is also provided.

According to another aspect of the invention, there is provide a temperature control system employed in a electrophotographic printer for controlling the temperature of a heat roller.

The system includes a first mechanism for keeping the temperature of the heat roller in an operable range, the first mechanism being actuated when printing is executed;

a second mechanism for keeping the temperature of the heat roller in a standby range, the second mechanism being actuated when printing is not executed, the temperature of the standby range being lower than of the operable range, and a control mechanism for raising the temperature of the heat roller up to the upper limit of the operable range before the first mechanism is switched to the second me when printing is terminated.

DESCRIPTION OF THE ACCOMPANYING DRAWINGS

DESCRIPTION OF THE EMBODIMENTS

Figure 1:
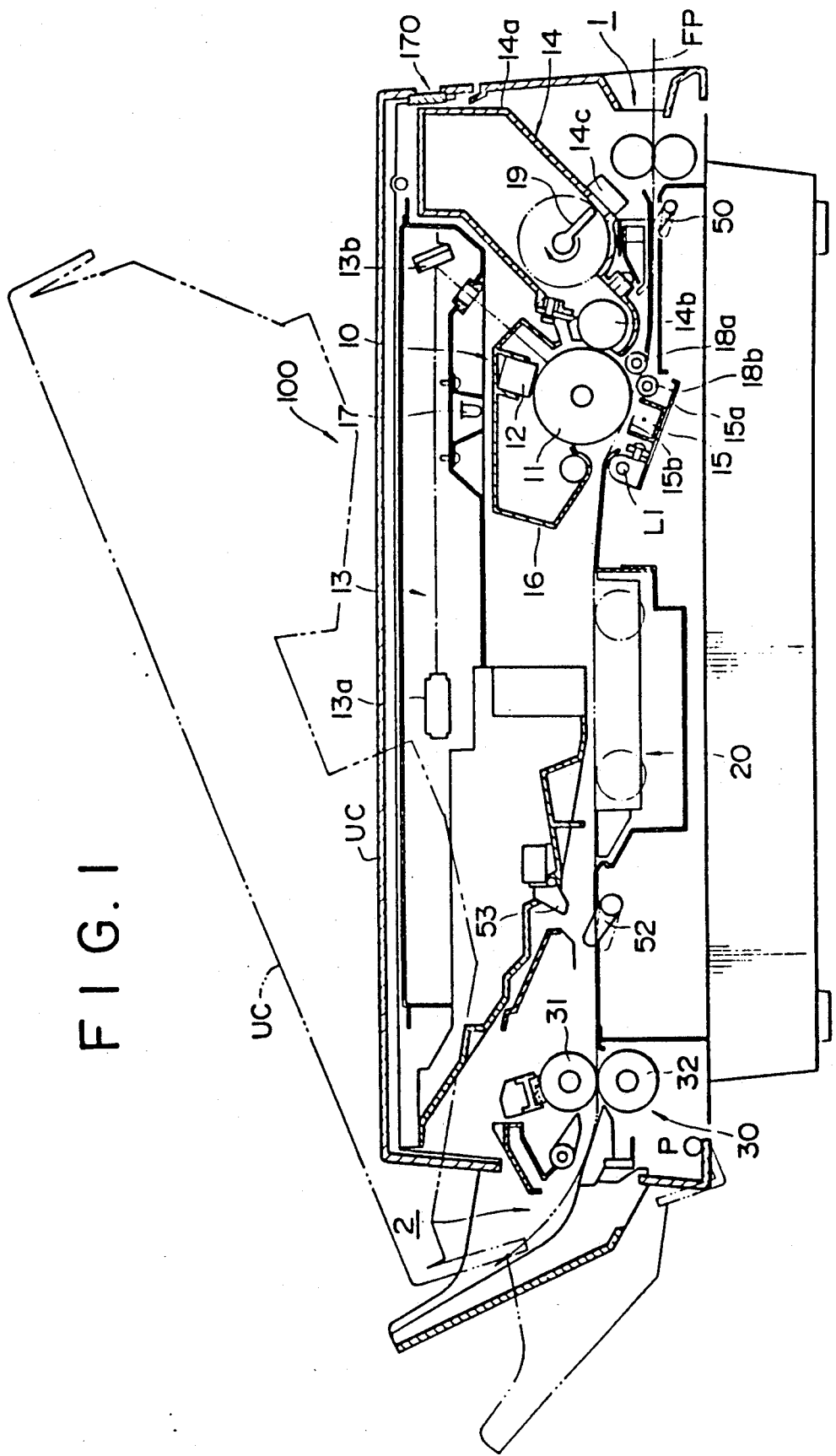
FIG. 1 is a schematic sectional view of a printer embodying the present invention.

A printer 100 shown in FIG. 1 is a laser beam printer employing an electrophotographic image transfer system. The printer 100 comprises, in sequence, a transfer unit 10 including a photoconductive drum 11, a tractor unit 20 having an endless belt 21 for feeding a recording sheet, and a fixing unit 30 having a pair of rollers 31, 32 for heating and pressing an unfixed toner image in order to fix it on the recording sheet. Light carrying printing data from a host computer or the like is emitted from a laser scanning unit (LSU) 13, the charged circumferential surface of a photoconductive drum 11 is exposed to the light, and a latent image is formed on the circumferential surface of the photoconductive drum 11. Toner adhered to the circumferential surface of the photoconductive drum 11 to develop a toner image by a developing unit 14. Then, the toner image is transferred onto the recording sheet at a transfer charger 15, and the image thus transferred is fixed by a fixing unit 30. The printer 100 employs the electrophotographic image transfer system, and so it is designed to be a page printer which starts printing after the printing data for one page is accumulated. The laser scanning unit 13 is secured to an upper cover UC. The upper cover UC is rotatably disposed on the main body of the printer 100 so that it can be rocked around a pivot axis P.

This printer 100 uses a continuous form recording sheet FP, which is known as fan-fold sheet. The fan-fold is a foldable continuous sheet having feed holes at both side ends, and perforated tear lines along which the recording sheet FP is cut off easily. Projections are provided on the endless belt 21 which are to be fitted to the feed holes of the continuous form recording sheet FP. The continuous form recording sheet FP is fed from a feed port 1 to a discharge port 2. It should be noted that the printer 100 is designed to print pages between perforations in order to prevent printed data from tearing apart when the recording sheet FP is torn off at the perforated tear lines.

In case of a printer using a cut-sheet, the distance between transferring position and fixing position is not so important because printing data for one page is printed onto one sheet of recording paper. On the other hand, in a printer using a continuous sheet, if the whole portion of the sheet carrying unfixed toner image is caused to pass through the fixing position and fixed, the paper may be wasted to the extent of the distance between transfer and fixing positions. Consequently, it is necessary to determine the portion of the sheet carrying a toner image to be fixed. In other words, it is necessary to determine the portion carrying an unfixed toner image to remain in the printer between the transfer and fixing positions.

When the printing quality is taken into consideration, the interruption and resumption of transfer and fixing should preferably be made at the perforations where data is not printed. For this reason, the distance between the transfer position and fixing position is preferably arranged to be equal to the length of one page so that the perforations are located at the transfer and fixing positions when printing is stopped.

As arranged above, the portion carrying an unfixed toner image of one page length remains between the transferring and fixing positions in a standby state when the printing is terminated. When another page is printed, the unfixed toner image is fixed and the remaining page is discharged. In this way, waste of paper due to the fixing of every transferred image becomes avoidable.

The distance between the transferring and fixing positions in this printer 100 is set to eleven inches long for the continuous recording sheet having a page length of eleven inches long.

The transfer unit 10 comprises a charger 12 for charging a photoreceptor material on the circumferential surface of the photoconductive drum 11 with electricity, the laser scanning unit 13 for exposing the charged circumferential surface of the photoconductive drum 11, to light a developing unit 14 for adhering toner to the latent image formed on the photoconductive drum 11, a transfer charger 15 for charging the recording sheet FP with electricity to cause the toner image to be transferred to the recording sheet FP, a cleaning unit 16 for removing the residual toner from the drum, and a discharging LED 17 for totally exposing the photoconductive drum 11 to light so as to remove the charge therefrom.

The photoconductive drum 11 should be exchanged after being used for printing a certain number of pages, since it properties will deteriorate and the drum will fail to ensure clear printing. For example, a limit of use is set at approximately 20,000 pages. The number of printed pages are electrically counted and recorded in a counter by a control system which is described later. This counter is reset when an upper cover UC is shut after a new photoconductive drum 11 is installed.

An outwardly protruding projection (not shown) is provided on a new photoconductive drum 11. As the projection presses on a reset switch, not shown, provided on the body side, the control system can detect that the new photoconductive drum 11 is placed in position. The projection retracts when the operation is started and an indication of the new drum disappears. The control system resets the counter when the upper cover UC is shut after the reset switch is turned on.

The laser scanning unit 13, which is secured in the upper cover UC, continuously deflects ON/OFF-modulated beams from a semiconductor laser (not shown) by means of a polygon mirror 13a. The laser beams are converged by means of a f$\theta$ lens (not shown), reflected by a beam bender 13b so that scanning lines are formed on the photoconductive drum 11, then an electrostatic latent image on a dot basis is formed as the drum rotates.

The developing unit 14 comprises a toner case 14a in which toner is accumulated, a developing roller 14b for adhering the toner onto the circumferential surface of the photoconductive drum 11 provided at the lower end of the case 14a, and a piezoelectric sensor acting as a low toner sensor 14c for detecting the presence or absence of the toner in the case 14a.

In normal text printing, the printing of letters are started from the left-hand side of paper so that the frequency of use of toner normally tends to become high in a portion corresponding to the left-hand side of the paper. For this reason, the low toner sensor 14c is provided in the portion corresponding to the left-hand side of the paper where the toner consumption is large.

Heretofore, two dry development methods have been generally known. One of them is a so-called monocomponent development method, and the other is a two-component development method.

In the two-component development method, carrier is mixed with toner, and is stirred at relatively high speed by a scraper or the like in order to charge the toner.

On the other hand, in the monocomponent development method, toner is fed to a developing roller or the like without using carrier for charging the toner. This monocomponent development method is disclosed in U.S. Pat. No. 3,909,258. However, there is a problem in this monocomponent development method. That is, the toner tends to form a block in a toner box. In order to overcome the above problem, an improved monocomponent development method, in which a relatively small amount of carrier is mixed with the toner, is disclosed in U.S. Pat. No. 4,640,880. With the mixture of a small amount of carrier with the toner, lubrication between the toner grains is improved, which prevent the toner from forming blocks. It should be noted that the mixture of the carrier does not affect chargeability of the toner. In this improved monocomponent development method, the main function of the scraper is to feed the toner to the developing roller or the like. Accordingly, the scraper rotates relatively slowly in the toner box. In the printer of the embodiment, the above-said improved monocomponent development method is employed.

Figure 3:
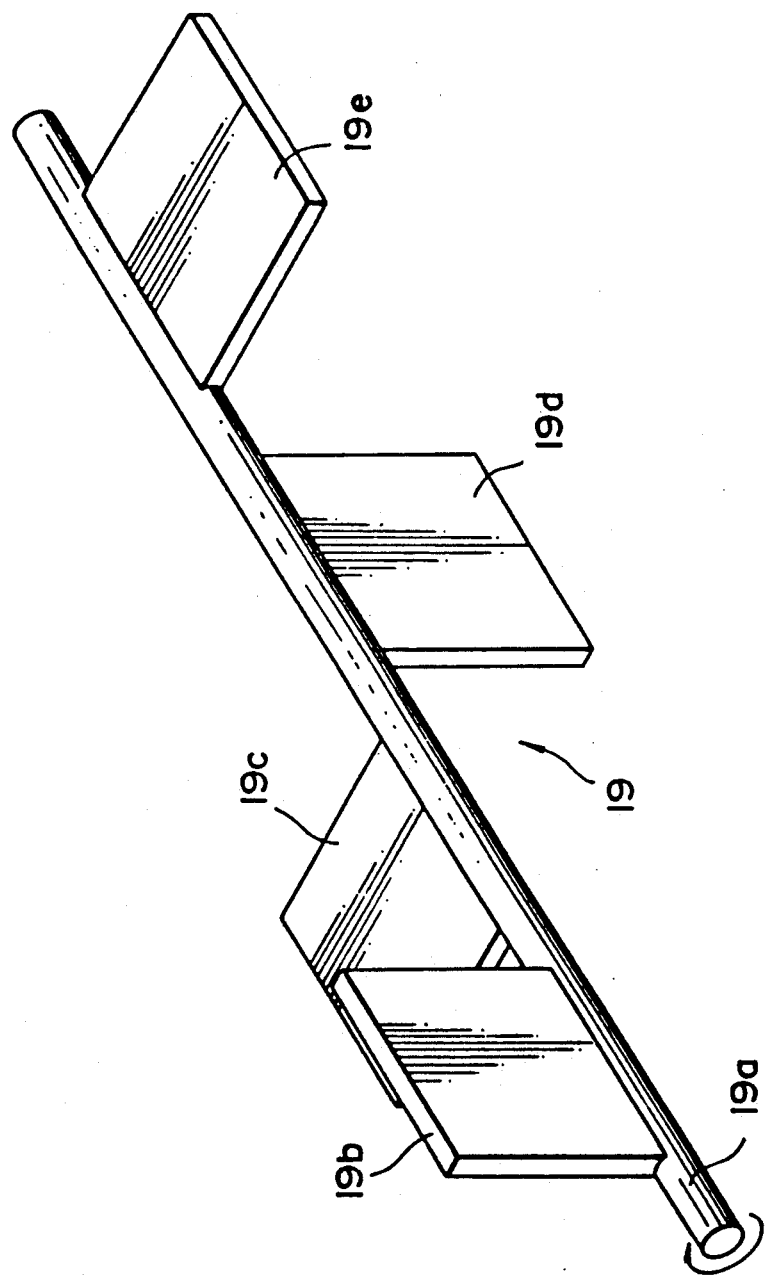
FIG. 3 is a perspective view of a scraper.

A scraper 19 is provided in the toner case 14a. The scraper 19 slowly rotates to supply the toner inside the case toner to the developing roller 14b. The scraper 19 is, as shown in FIG. 3, composed of a rotary shaft 19a to be driven by a main motor, and four pieces of blades 19b, 19c, 19d, 19e fitted such that the angle between the surfaces of the blades 19b and 19c is 90 degrees, that of the blades 19b and 19e is 180 degrees, and that of the blades 19b and 19e is 270 degrees. In this specification, this angle well be called a mounting angle, i.e., the mounting angles, with respect to the blade 19b, of the blades 19c, 19d, and 19e are 90 degrees, 180 degrees, and 270 degrees, respectively. The blades 19b through 19e are driven to rotate slowly in the direction of an arrow shown in FIG. 3.

Since the four blades are arranged to have different mounting angles, the load applied when the toner is forced out is onequarter that of the conventional scraper having all the blades set to have the same mounting angle. Consequently, the load applied to the motor decreases and fluctuates less with the scraper of this embodiment, thus suppressing noise generation.

By sequentially making the mounting angles of the blades of the scraper 19 different, as stated above, a certain amount of toner can be gradually moved to a portion corresponding to the right-hand side of the paper as the scraper 19 slowly rotates.

When toner consumption in the portion corresponding to the right-hand side of the paper increases as it is used for a graphic output, for instance, low toner is left undetected by the low toner sensor 14c. In such a case, as the conventional scrapers do not function to move the toner in the manner stated above, carrier may be transferred onto the circumferential surface of the photoconductive drum 11.

According to the scraper in this embodiment, the occurrence of the carrier being transferred on the photoconductive drum 11 is made avoided even when the toner consumption is large on the side where the toner low sensor 14c is not provided.

The transfer charger 15 is secured to an arm 15a which can be rotated by a cam mechanism around a pivot shaft L1. Moreover, a pair of guide rollers 18a, 18b are integrally secured to the arm 15a, the guide rollers 18am 18b being laterally positioned so that the continuous form recording sheet FP is nipped therebetween.

When printing is started, it is necessary to idly rotate the photoconductive drum 11 without feeding the recording sheet until the exposed portion of the photoconductive drum 11 is located at the transfer position. In this case, the arm 15a is moved down to lower the guide rollers 18a, 18b, and accordingly, the recording sheet FP is retracted from the circumferential surface of the photoconductive drum 11. The life of the photoreceptor material is thus prevented from being shortened due to wear. In addition, the paper is also prevented from being soiled by residual toner on the photoconductive drum 11.

An opening is formed in the transfer charger 15. The opening of the transfer charger 15 is arranged so that its rearward half, in the feeding direction of the recording sheet FP, is covered with a Mylar film 15b, and the discharging area, which is uncovered, of the transfer charger 15, is positioned at the upstream side, in the rotational direction of the photoconductive drum 11 with respect to the contact portion between the photoconductive drum 11 and the recording sheet FP.

Conventionally, the whole opening of a transfer charger has been left opened for charging. With such a setting, however, transfer efficiency tends to vary considerably as ambient humidity changes.

By narrowing the discharge area, corona discharge efficiency can be increased to prevent toner from being reversely charged under the influence of the corona discharge. Moreover, the period of time in which the recording sheet FP contacts the photoconductive drum 11 under pressure after the toner image is transferred thereto, can be set longer than that of conventional printers. As a result, transfer efficiency in the whole humidity range can be substantially improved. Experiments show that the transfer efficiency is improved to a great extent, especially when humidity is low. It is also possible to arrange the transfer charger 15 itself at the upstream side, in the sheet feed direction, in order to prolong the period of time for applying pressure after transfer.

Figure 2:
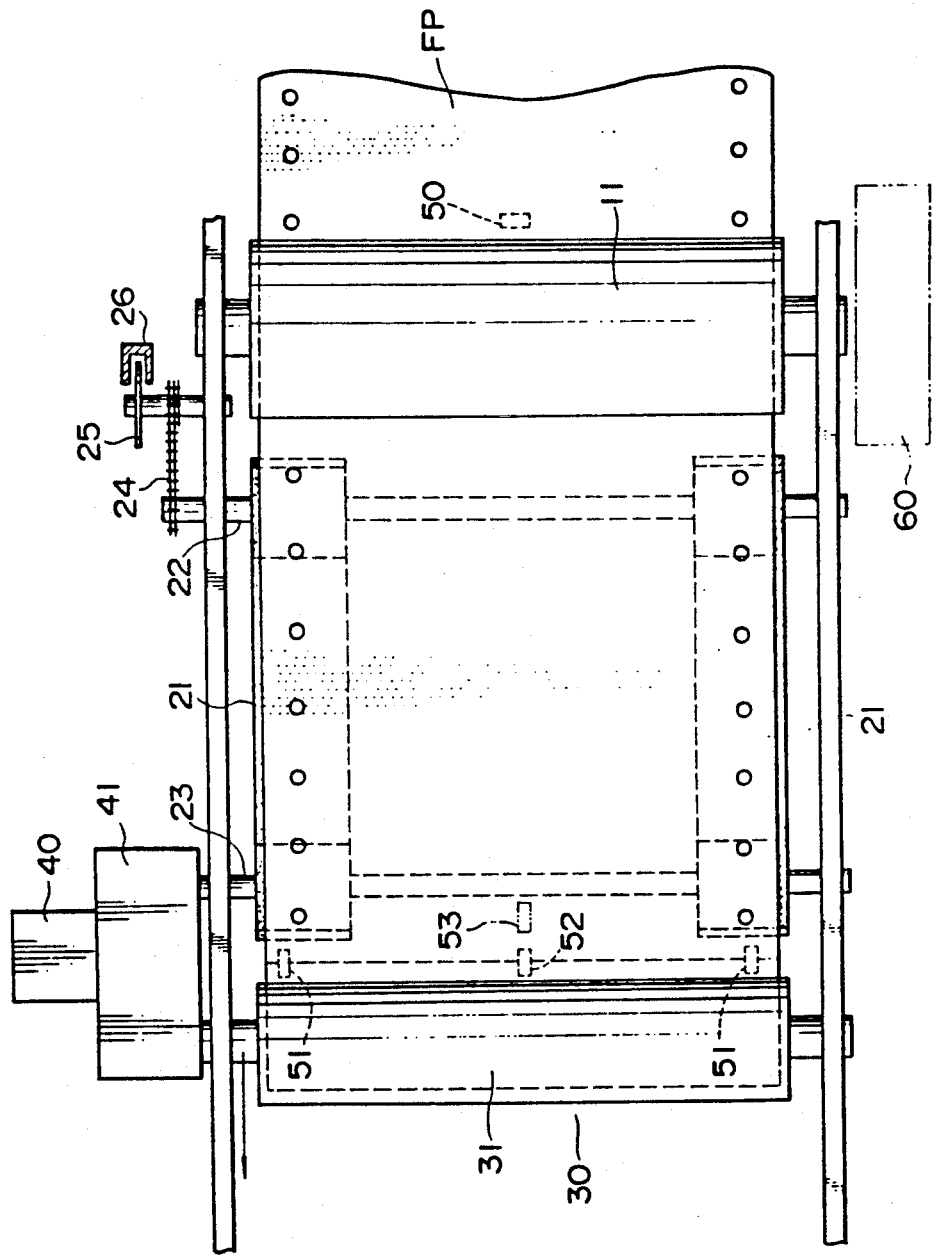
FIG. 2 is a top view of the paper conveying portion of a printer of FIG. 1.

The toner adhering to the photoconductive drum 11 is not totally removed therefrom after the termination of the transferring process. As the residual toner is unnecessary for the next printing, it is removed by a cleaning unit 16. The waste toner thus removed is stored in a waste toner box 60 detachably fitted to the side of the photoconductive drum 11 as shown in FIG. 2.

When a certain amount of waste toner is accumulated in the waste toner box 60, it overflows into the printer unless it is discarded. The waste toner may soil the inside of the printer if printing is started without the waste toner box 60.

In conventional printers, sensors have been used to respectively detect, the presence or absence of such a waster toner box 60, and the full condition of the waster toner box 60. The problem is that the plurality of sensors thus required tends to render the control system complicated.

In the printer according to the present embodiment, only one sensor is used to detect both conditions.

Figure 4:
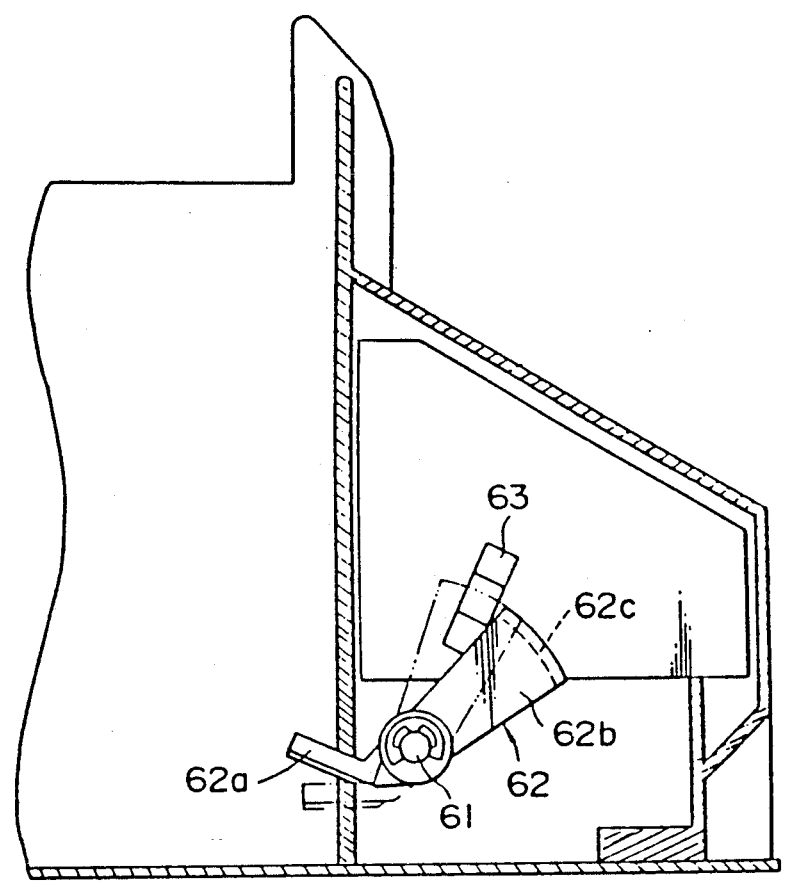
FIGS. 4 and 5 are side views of the waste toner sensor.

FIG. 4 illustrates the detecting mechanism. The waste toner box 60 is movably inserted and guided by the body, the waste toner box 60 being vertically movable. An actuator 62 is rotatably pivoted by a fulcrum 61, on the body, such that a contact portion 62a is located at a position where the bottom side of the waste toner box 60 is located. A fan-shaped portion 62b is provided at the other end of the rod 62, and a light-shading (or blocking) wall 62c is formed on the arcuate peripheral edge of the fan-shaped portion. The light-shading wall 62c is capable of crossing the space between a light receiving element and a light emitting element of a photo-interrupter 63.

If the waste toner box is not attached, the rod 62 is caused to pivot clockwise by its own weight, as shown by a continuous line of FIG. 4, so that its contact portion 62a ascends and the light-shading (or blocking) wall 62c is located under the photo-interrupter 63. In this state, the photo-interrupter 63 produces a signal indicating that no rays of light are shaded and the control system determines that an error relating to the waste toner box 60 has occurred.

When the waste toner box 60 is attached, the contact portion 62a is forced down by the weight of the box and the rod is revolved counter-clockwise up to a substantially horizontal state as shown by a broken line of FIG. 4. The light-blocking wall 62c is set in a position where it blocks the photo-interrupter 63. In this state, the photo-interrupter produces a signal indicating that the rays of light are blocked and the control system decides that no error relating to the waste toner box 60 has occurred.

Figure 5:
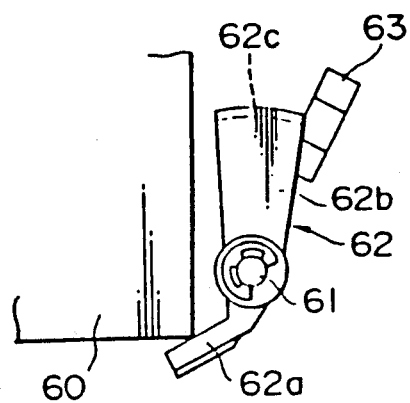

When the waste toner box 60 is filled with waste toner, the contact portion of the rod is caused to descend due to the weight of accumulated toner, as shown in FIG. 5, and the light-blocking wall 62c moves up to the left-hand side of the photo-interrupter 63. In this state, the control system again determines that an error relating to the waste toner box 60 has occurred.

In this way, one sensor can be used to detect that the waste toner box 60 is not installed and that the waste toner box 60 is filled with waste toner. Although this sensor is arranged to monitor the presence or absence of the waster toner box and the amount of waste toner from the balance in weight between the rod 62 and the waste toner box 60, it is possible to employ a spring or the like to maintain the balance as well as the dead weight of the rod 62.

The tractor unit 20 is arranged so that, as shown in FIG. 2, the two endless belts 21, 21 stretched between a driving shaft 22 and a driven shaft 23 are driven by the main motor 40 via a field clutch (not shown, hereinafter called the F clutch) and a gear train (not shown) provided in a box 41.

The gear train extending from the main motor 40 to the drive shaft 23 in the tractor unit 20 is arranged so that the continuous recording sheet FP would be fed at the velocity of 50 mm/sec. if the tractor unit 20 independently feed the recording sheet FP. Moreover, the gear train contains a undirectional clutch which races with a predetermined resistance, in compliance with sheet tension, when the paper is drawn at a rate higher than 50 mm/sec. to prevent the paper from overdriving the motor 40.

Figure 6:
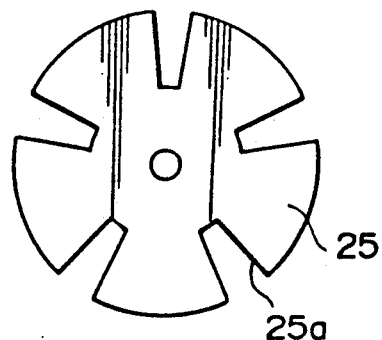
FIG. 6 shows a disc for use in generating PFS pulses.

The driven shaft 22 is connected with a disc 25 via a chain 24. The disc 25 is rotatable in response to the rotation of the driven shaft 22. As shown in FIG. 6, the disc 25 is provided with slits 25a which are spaced from each other by a predetermined space. The disc 25 is positioned between the light emitting member and the light receiving member of the photo-interrupter 26, and a pulse corresponding to the amount of movement of the recording sheet FP is thus obtainable. The photo-interrupter 26 is hereinafter called the PFS (Paper Feed Sensor), with its output constituting the PFS pulse.

The PFS pulse is outputted such that when the recording sheet is fed by ⅛ inch, one pulse is outputted. Further, the signal corresponding to the slit portion 25a and the signal corresponding to the portion other than the slit 25a correspond to the perforated lines of the continuous recording sheet FP, and the non-perforated portion, respectively.

The positional relation between the disc 25 for generating the PFS pulse and a base plate on which the photo-interrupter 26 is mounted may not be the same in individual printers because of assembly errors. If the slits 25a, formed in the disk 25, are rectangular in the radial direction, the pulse width thus outputted may vary, depending on where along the radial direction the photo-interrupter 26 has detected the slits 26a and depending on the shift in relative radial position between the disc 25 and the photo-interrupter 26.

As this printer is arranged so that the paper feed error is judged from the detection of the PFS pulse, the variation of the pulse width may result in misjudgment of an error.

For this reason, the slit 25a formed in the disc 25, is fan-shaped, so that its width gradually increases toward the circumference. In other words, the slit 25a is defined by a pair of radii of the disc 25. With this fan shape, the width of the pulse thus outputted can be unified (i.e., the ratio between slit 25a and the non-slit portion remains constant) irrespective of the position where the photo-interrupter has detected the slit in the radial direction of the disc 25, thus preventing the misjudgement on the error. In addition, the assembly precision required is eased and hence assembly workability is improved.

Sensors for detecting paper errors will subsequently be described.

In a conventional laser printer using cut sheets, two sensors are provided along a sheet feed path to detect the jamming of recording sheet. Paper errors are detected when the sheet does not pass the down-stream side sensor a predetermined time after it passes the up-stream side sensor. Since there are no breaks in the continuous recording sheet, the aforementioned method of detection cannot be utilized in a printer using a continuous recording sheet.

In this printer 100, there are provided four kinds of sensors for detecting the presence or absence of the paper along the sheet feed path. The sheet empty and paper jamming conditions are detected by detecting the changing of a sheet feed speed and the lifting of the sheet.

The first sensor is an empty sensor 50 provided between the feed port 1 and the transfer unit 10. This printer 100 does not print on the portion adjacent to the perforated lines which are used as a break between pages. The perforated lines are located right under the photoconductive drum 11 of the transfer unit 10 and at the position of the fixing rollers 31, 32 when printing is stopped in this printer 100. The sheet empty condition can be detected from the output of the empty sensor 50 when the last page of the recording sheet FP is located in the printer. Moreover, it is detectable by counting the PFS pulses, what portions of the recording sheet is positioned at the transfer unit 10, at the fixing unit 30, and further at the empty sensor. Consequently, the counting of the PFS pulse and the output of the empty sensor 50 can be used to detect the recording sheet FP being torn off at a non-perforated portions.

The second sensor comprises skew sensors 51, 51 provided between the fixing unit 30 and the tractor unit 20. The skew sensors 51, 51 are used for detecting the skew and cutting-off of the continuous recording sheet FP. The sensors 51, 51 are capable of detecting the sheet when at least one side thereof lifts up.

The third sensor is a top sensor 52 provided in the central part between the skew sensors 51, 51. The top sensor 52 is used for detecting the leading end of the paper when the printing is started. After the predetermined number of pulses have been counted after the leading end of the recording sheet FP passes the top sensor 52, the leading end thereof reaches the fixing unit 30, whereas the following perforations are positioned at the transfer unit 10.

The fourth sensor is a jam sensor 53 provided in the upper cover UC substantially opposite to the top sensor 52, with the sheet feed path therebetween. The jam sensor 53 is used for detecting the sheet when the sheet is jammed in the fixing unit 30 and the central part of the recording sheet swells out to contact the jam sensor 53.

The fixing unit 30 comprises a heat roller 31 provided in the upper portion of FIG. 1, and a press roller 32. The continuous recording sheet FP is positioned between the rollers 31, 32, and is pressed against the heat roller 31 by the press roller 32 with a predetermined pressure. In the heat roller 31, a heating halogen lamp, and a thermistor for temperature detection are provided.

The heat roller 31 is driven by the main motor 40 to rotate via the F clutch and the gear train and is arranged so that, when the continuous recording sheet FP is held between the rollers 31, 32, it is fed at the speed of 75 mm/sec. As a result, the continuous recording sheet FP is actually driven by the fixing unit 30, whereas the tractor unit 20 mainly functions to prevent skewing of the continuous recording sheet FP.

If the continuous recording sheet FP is kept pressed against the heat roller 31 while printing is in standby state, the paper may be scorched with the heat of the heat roller 31. In order to avoid the scorching of the sheet, in this printer 100, the press roller 32 facing the heat roller 31 is made vertically movable so that the continuous sheet is retracted from the heat roller 31 while printing is in standby state.

In the meantime, rocking of the press roller 32 and of the transfer charger 15 are implemented by the same drive means.

Figure 7:
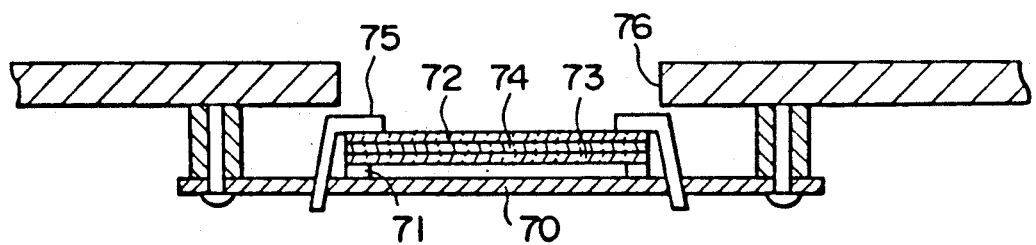
FIG. 7 illustrates a construction of a conventional liquid crystal display panel.

A general liquid crystal display panel heretofore in use is, as shown in FIG. 7, built by mounting two glass plates 72, 73 on a substrate 70 via a conductive rubber member 71 and nipping a layer of liquid crystal 74 between the glass plates 72, 73. Moreover, the edges of the glass plates are enclosed with a frame 75, which is secured to the substrate 70. The substrate 70 is secured with screws, to the body so that the display panel can be viewed through an opening 76.

The arrangement stated above, however, has posed a problem that the increased number of parts makes it troublesome to assemble the display unit.

Figure 8:
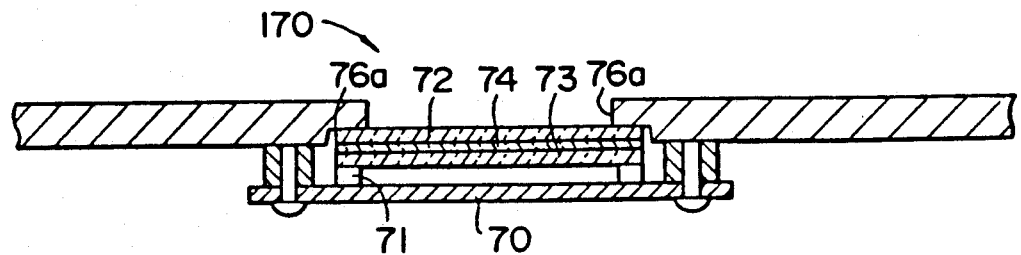
FIG. 8 shows a construction of a liquid crystal display panel of the printer of FIG. 1.

In the liquid crystal display unit 170 of this embodiment, a stepped portion is provided in the peripheral edge of the opening 76 of the body as shown in FIG. 8. While the glass plates 72, 73 between which the liquid crystal layer 74 is inserted are directly mated with the stepped portion 76a, the combination is secured with screws onto the body. With this arrangement, the frame can be omitted, so that the number of parts becomes reducible.

Figure 9:
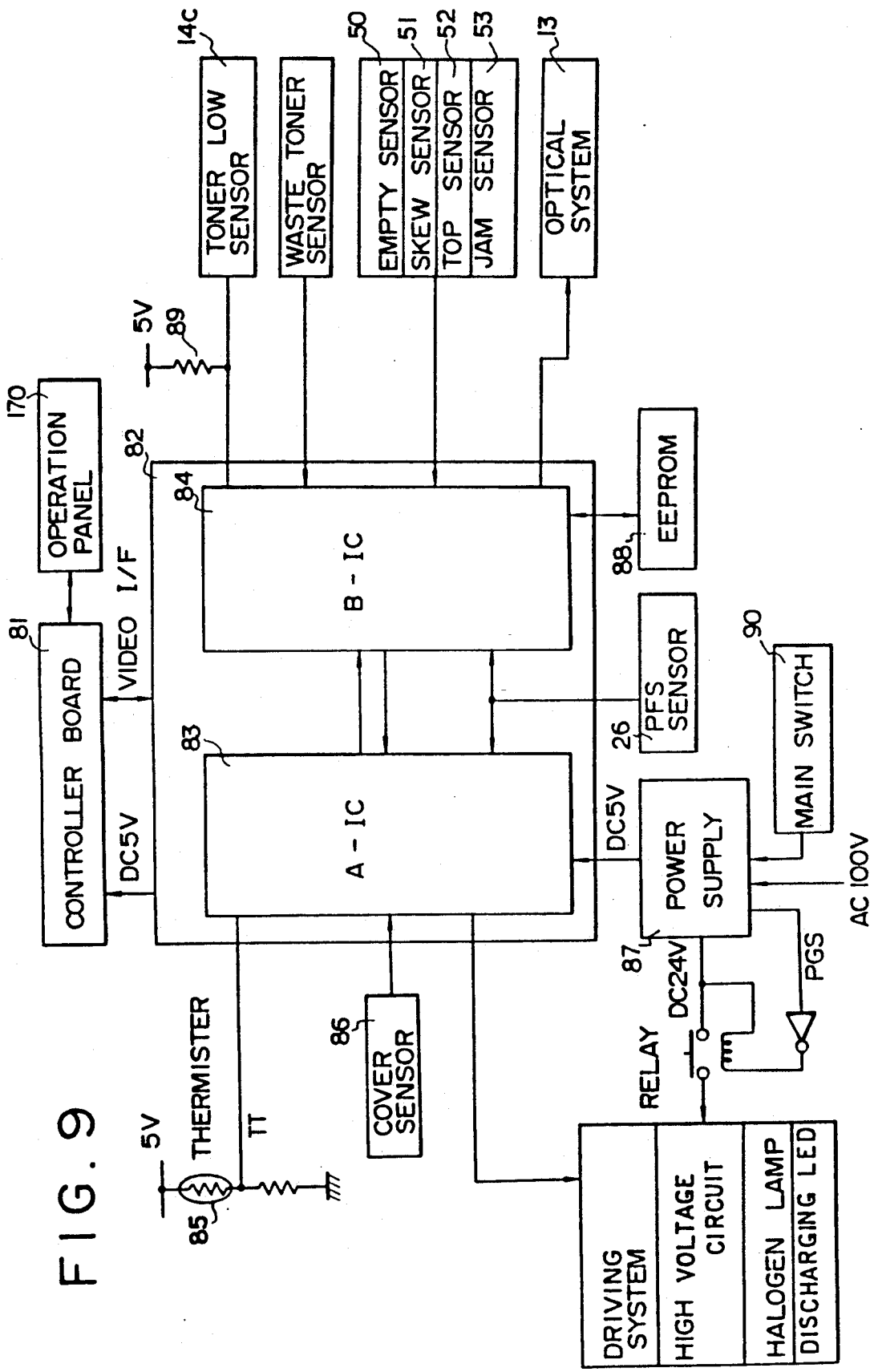
FIG. 9 is a block diagram illustrating a control system in the printer of FIG. 1.

FIG. 9 shows a control circuit of the printer.

This circuit comprises a controller 81 for developing the printing data received from a host computer into a map on a dot basis and outputting the map, and a driver 82 comprising two CPU's. One of the CPU's is A-IC 83 for controlling mainly printing; and the other is a B-IC 84 mainly for performing error detection. The controller 81 is provided with a buffer which is capable of developing printing data corresponding to six pages of the recording sheet. New data is successively written to the buffer from time to time as the data is transferred to the driver.

The controller 81 and the driver 82 are connected via a video interface (video I/F) for transferring printing data and a command line for transmitting various data.

The A-IC 83 is connected with a high voltage circuit to which biases for the charger 12 and the like in the transfer unit 10 are connected, and further, a drive system including the main motor 40, the F clutch 41, the halogen lamp in the heat roller 31 are connected to the A-IC to be controlled thereby.

A thermistor 85 for detecting the temperature of the heat roller 31, a cover sensor 86 for detecting the opening and closing of the upper cover UC, and the PFS sensor (or photo-interrupter) 26 are connected to the A-IC as the sensors for supplying data to the A-IC.

The heat roller 31 is controlled such that the temperature of the heat roller is in a fixing range when printing is executed, and in a standby range when the printer is in standby state, in order to save power and to prevent the printer temperature from rising.

Power is supplied to the halogen lamp provided in the heat roller 31 as a heat source from the power supply 87 for supplying 100 volts a.c. The power supply is turned ON/OFF by a signal from the A-IC 83. The A-IC 83 receives an analog output TT, which corresponds to the temperature of the heat roller 31, from the thermistor 85 provided adjacent to the heat roller 31 and executes A/D conversion so as to perform temperature control.

In the printer of this embodiment, when the temperature is lowered from the fixing temperature to the standby temperature, the temperature is raised up to the upper limit of the fixing temperature being before lowered.

Figure 10A:
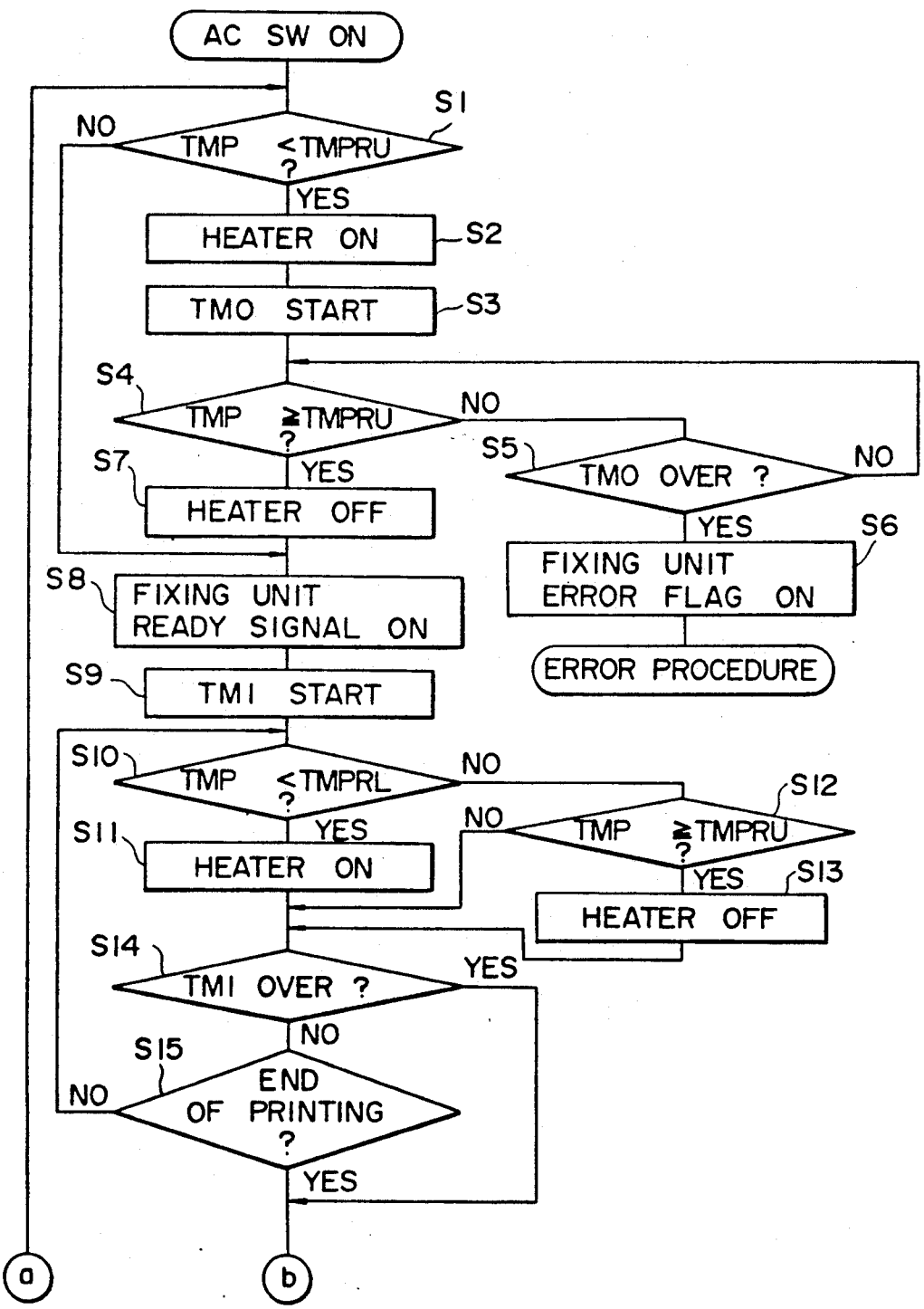
FIG. 10 is a flowchart illustrating temperature control of the heat roller.

FIG. 10 is a flow chart illustrating temperature control.

In the flow chart, the temperature of the heat roller 31, the upper limit and the lower limit of the fixing temperature, and the upper limit and the lower limit of the standby temperature are abbreviated as "TMP", "TMPRL", "TMPRU", "TMPSL" and "TMPSU" respectively.

The temperature of the heat roller TMP is set to be in the fixing range in steps S1 through S15, and set to be in the standby range in steps S16 through S25.

When the main switch is turned on, it is discriminated at step S1 whether the temperature of the heat roller is lower than the upper limit of the fixing range. In steps S2 through S7 if the temperature of the heat roller TMP is lower than the upper limit of the fixing range, it is heated until the temperature TMP is raised up to the upper limit of the fixing range. Otherwise, the process branches to an error procedure. If the temperature of the heat roller TMP is higher than the upper limit of the fixing range, the procedures described above are skipped.

If it is discriminated that the temperature of the heat roller TMP is lower than the upper limit of the fixing range at step S.1, the heater is turned on at step S2, a limit value of warm-up time is set to a limit timer TMO at step S3, and the procedure of steps S4 and S5 is repeatedly executed.

If time-up of the timer TMO occurs before the temperature raises up to the upper limit of the fixing temperatures, a flag indicating that fixing unit is out of order is set and error procedure is executed. The error procedure includes the processes of turning off the heater, the motor and the like, and displaying error indications on the operational panel 170. When the temperature of the heat roller TMP rises up to the upper limit of the fixing range before the time-up of the timer TMO, the heater is turned off at step S7 and the process proceeds.

At step S8, a signal indicating that the ready condition of the fixing unit 30 is outputted, and at step S9, a timer TM1 for limiting the maximum period of time to keep the fixing condition is started. This timer is set in order to prevent the temperature inside the printer from raising due to the heating unit which is kept to have the fixing temperature for a long period of time.

In steps S10 through S13, the heater is turned on when the temperature is lower than the lower limit of the fixing range, and the heater is turned off when the temperature TMP is higher than the upper limit of the fixing range. In steps S14 and S15, time-up of the timer TM1 and end of printing is detected, respectively. The procedure of steps S10 through S13 is repeatedly executed until the period of fixing condition exceeds the maximum period or the printing is terminated, and the temperature of the heat roller fluctuates within the $\pm 5$ degrees of fixing range with respect to the fixing temperature.

If time-up of the timer TM1 or end of printing is detected at steps S14 and S15, it is further examined whether the temperature of the heat roller TMP is higher than the upper limit of the fixing range TMPRU at step S16.

If the temperature of the heat roller TMP is lower than the upper limit of the fixing range TMPRU, the heat roller 31 is heated so that the temperature TMP exceeds the upper limit of the fixing range TMPRU, and then the heater is turned off at step S19.

Controlled as above, the period of time between the end of printing and the time when the temperature of the heat roller TMP reaches the standby range is prolonged. Accordingly, if the period from the end of printing to the start of another printing is relatively long, the warm-up period for raising the temperature of the heat roller TMP to the fixing temperature range can be made short. In other words, controlled as above, the period of time in which the temperature of the heat roller TMP is raised up to the fixing temperature range is prolonged.

In step S20, the signal indicating the ready condition of the fixing unit 30 is turned off, and the process goes to the step S21.

In steps S21 through S24, if the temperatures of the heat roller TMP is lower than the lower limit of the standby range TMPSL, the heater is turned on, while if the temperature TMP exceeds the upper limit of the standby range TMPSU, the heater is turned off. The routine of steps S21 through S24 is repeated until printing is required (detected at step S25), the temperature of the heat roller TMP fluctuates within the range of $\pm 5$ degrees of the standby range with respect to the standby temperature. If printing is required, the process goes to step S1.

Figure 11:
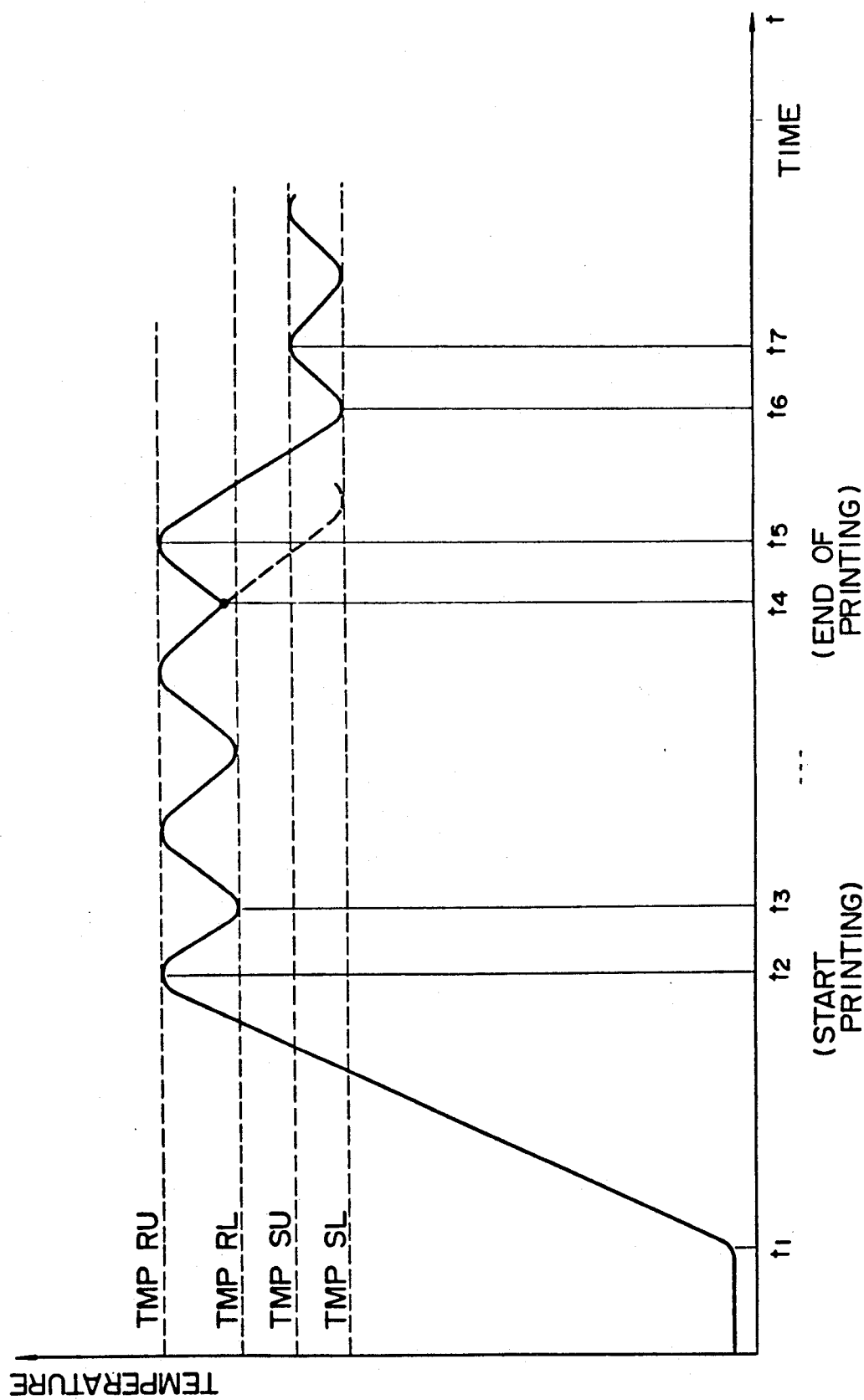
FIG. 11 is graph showing the temperature of the heat roller controlled by the controlling device embodying the present invention.

FIG. 11 is a graph showing the temperature of the heat roller TMP.

In FIG. 11, the main switch is turned on at $t_1$, then the halogen lamp is turned on and the temperature of the heat roller TMP begins to rise. The temperature TMP reaches the upper limit of the fixing temperature TMPRU at $t_2$, and the halogen lamp is turned off.

At $t_3$, the temperature TMP becomes lower than the lower limit of the fixing range TMPRL, then the halogen lamp is turned on again in order to raise the temperature TMP. Thus, the temperature of the heat roller TMP fluctuates between the upper limit and the lower limit of the fixing range.

When printing is terminated at $t_4$, the halogen lamp is turned on in order to raise the temperature of the heat roller TMP. When the temperature TMP exceeds the upper limit of the fixing range TMPRU, the halogen lamp is turned off, and the temperature of the heat roller TMP falls down. In this case, the period of time necessary for the temperature of the heat roller TMP to reach the standby range is relatively longer than the case in which the heater is not turned on at the end of printing.

When the temperature of the heat roller TMP is lower than the lower limit of the standby range TMPSL, the halogen lamp is turned on. At $t_7$, when the temperature of the heat roller TMP exceeds the upper limit of the standby range TMPSU, the halogen lamp turned off. Thereafter, the temperature of the heat roller is controlled to fluctuate between the lower and upper limits of the standby range.

On the other hand, if the halogen lamp is not turned on at the end of printing, the temperature TMP falls directly down to the standby range as shown by broken line in FIG. 11. In this case, the temperature of the heat roller reaches the standby range relatively in short period of time after the end of printing.

The B-IC 84 is connected with a semiconductor laser of the laser scanning unit 13 and an EEPROM 88 for storing printer life data.

As to means for inputting data the B-IC 84, the empty sensor 50, the skew sensor 51, the top sensor 52 and the jam sensor 53 are connected to the B-IC 84, all of which are concerned with the paper feeding function. In addition, the B-IC 84 is connected with the waste toner sensor for warning the presence or absence of the waste toner box 60 and the amount of accumulated waste toner, and the toner low sensor 14C for warning of the shortage of toner, which are provided in the transfer unit 10, and concerned with toner.

For the toner low sensor in a conventional laser printer, it is common practice to set the sensor to output a low level signal when no toner is detected. With this arrangement, however, the problem is that when the sensor is disconnected, the low level signal indicating the toner low condition cannot be detected. In other words, the disconnection of the sensor and the toner-sufficient condition cannot be distinguished in the conventional printer.

In this embodiment, the toner low sensor 14c outputs a high level signal when toner low is detected, while the B-IC 84 receives the signal in a pull-up state with use of a pull-up resistance 89 for receiving the signal in the pull-up state.

HIGH is thereby inputted to the B-IC 84 when toner low is detected by the sensor 14c, when disconnection occurs in the sensor system and when the developing unit 14 installed with the toner low sensor 14c not attached to the printer 100. In other words, a number of symptoms can simultaneously be detected with one sensor 14c.

The toner low sensor 14c comprises the piezoelectric element incorporated in the bottom surface of the toner case 14a and outputs a LOW level signal on sensing the pressure applied by the toner accommodated in the toner case 14a; and a HIGH level signal without such pressure.

When the toner is sufficiently stored in the toner case 14a, the toner is always placed on the piezoelectric element acting as the toner low sensor 14c, despite the operation of the scraper 19, and the LOW level signal is always outputted. On the other hand, when the amount of toner is low, the HIGH level signal is outputted irrespective of the operation of the scraper 19.

If the toner case 14a is substantially half filled with the toner, the toner is alternately placed on and swept off of the toner low sensor 14c as the scraper 19 slowly rotates, thus causing the alternative output of LOW and HIGH signals. Monitoring the duty ratio of the output of the toner low sensor 14c, the B-IC 84 judges the amount of the toner to be low when the HIGH signal exceeds 80 percent.

As toner is not supplied to the developing roller 14b by the scraper 19 immediately after power is supplied, the output of the toner low sensor during the first three seconds or, for two rotations of the scraper is ignored. After the elapse of three seconds, the toner low sensor 14c starts monitoring. Misjudgement of the toner low condition can thereby be prevented before the operation of the scraper 19 when power is supplied.

A-IC 83 and B-Ic 84 control the printer 100 with exchanging data via a plurality of signal lines. From the B-IC 84 to the A-IC 83, signals, such as a signal indicating that the B-IC 84 is in a standby state, a STOP signal for immediately stopping the operation of each unit of the printer 100 when an emergency error occurs, even if the printing is being executed, and a PAUSE signal for stopping the operation of each unit after predetermined operations, when a less urgent error occurs are transmitted.

On the other hand, error signals indicating errors in the drive system is transmitted from the A-IC 83 to the B-IC 84.

The B-IC 84 analyzes the error detected by itself and the errors transmitted from the A-IC 83 thereto, then determines their degrees of urgency in accordance with predetermined standards. The B-IC 84 selects the STOP or PAUSE signal depending on the degree of emergency, and then transmits the signal to the A-IC 83. The less urgent errors are errors relating to toner overflow, toner low and paper empty, while the other errors are treated as urgent errors.

Figure 12:
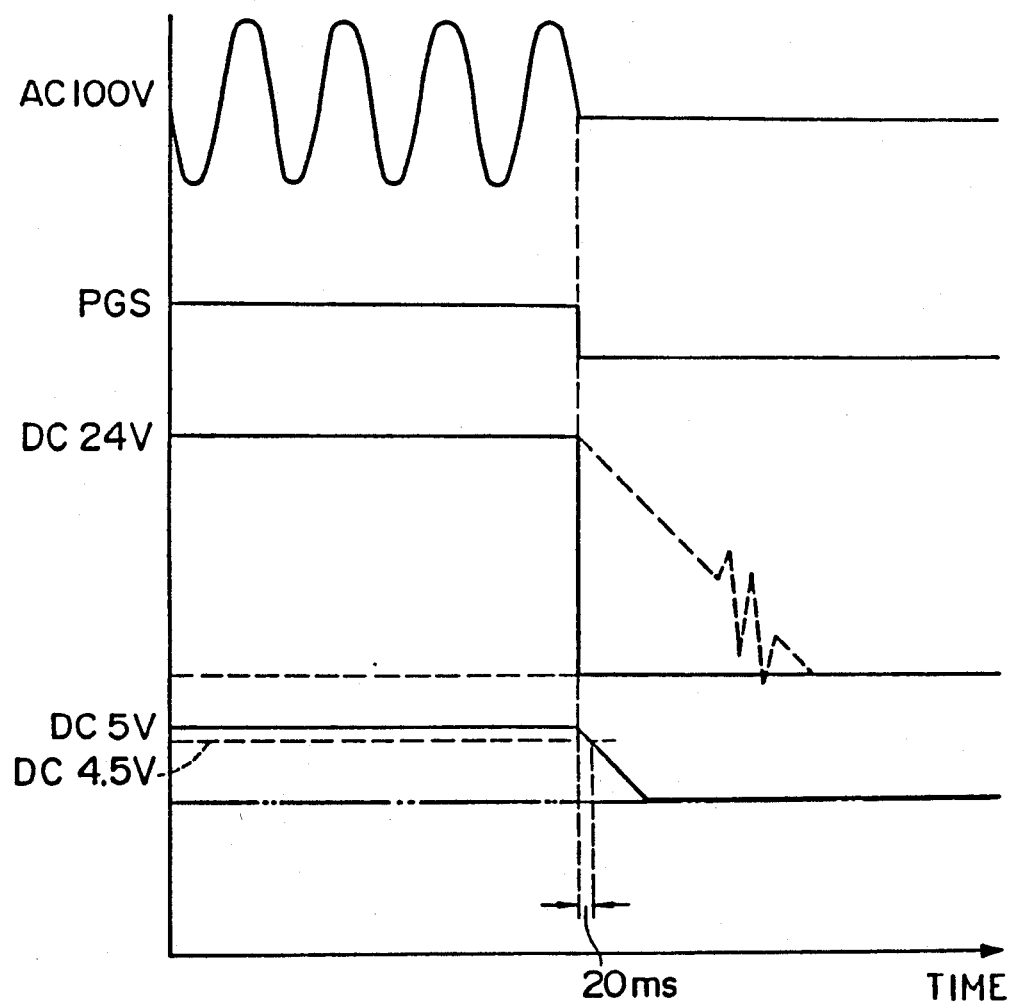
FIG. 12 is a graph illustrating power supply control of the printer of FIG. 1.

One hundred volts a.c. is applied to the printer, with the control system being driven at 5 volts d.c., the driving system, such as the motor being driven at 24 volts d.c. When a main switch 90 of the printer 100 is turned off, the voltage gradually drops from 24 volts d.c. to 0 volt, as shown by a broken line in FIG. 12.

The 5 volts d.c. power supply for the control system is so designed that more than 90 percent of the rated voltage (i.e. 4.5 volts d.c.) is held at least 20 msec. for storing data after the main power supply is turned off. Because, if the voltage becomes less than 90 percent of the rated voltage, the control system may fail to control driving system.

As to 24 volts d.c. power supply for the driving system, the voltage tends to fluctuate while it drops, because of the operation of a protection circuit on the power supply side. Besides, the control system does not operate as 5 volts d.c. is cut off at that point in time, which may cause vibration of the motor and hence malfunctions.

In this printer 100, the voltage applied to the driving system is instantaneously dropped from 24 volts d.c. to 0 volt on turning off the 100 volts a.c. main power supply 87 in order to prevent the aforementioned malfunctions. A relay is provided between the power supply and the driving system to act as a switch for the function stated above. The relay operates to cut off 24 volts d.c., either when a power good signal (PGS) representing the presence of the main power 87 supply is cut off, or when the upper cover is opened.

By instantaneously dropping the voltage from 24 volts d.c. to 0 volt as above, the driving system is stopped while the control system functions with 5 volts d.c. being applied. Moreover, the fluctuation of the voltage is prevented while it is dropping. Consequently, the motor is prevented from vibrating and hence malfunctioning.

Laser printers are generally provided with a data recovery function for reprinting a blank page due to jamming or the like.

The printer 100 of this embodiment is designed to determine the number of pages to be reprinted (page data) in the driver according to the respective errors: the paper jamming error, the paper empty error detected in a portion other than the performations or when the upper cover UC is opened during printing. Based on the number of pages, the controller 81 requests the host computer to transmit printing data to be reprinted.

The driver detects the page being printed at present according to the PFS pulse.

There are four kinds of page recovery data to be transmitted: namely, data "0" requiring no recovery, "1" requiring only the one whole page which is being transferred to be reprinted, "2" requiring the page being transferred and the page previously transferred to be reprinted, and "3" requiring the page being transferred and preceding two pages to be reprinted.

When trouble occurs on the first page, the page data "1" is transmitted and the controller 81 requests the host computer for data on the page being printed and transmits the data to the driver again after developing it in the buffer.

When trouble occurs on the second page, the third page or thereafter, the respective data is set at "2" or "3" and the controller 81 requests the host computer for data on the pages to be reprinted.

When the opening of the upper cover UC is detected during printing of the third page, the page data is set at "1".

It may otherwise be arranged that the page data on reprinting is not determined by the page that has undergone trouble, as stated above, but by the number of pages to be traced back, depending on the place where jamming has occurred.

Although reference has been made to the use of continuous sheet whose page length is 11 inches long in the embodiment shown, the continuous sheet whose page length is 12 inches long may also be used by changing a counter for counting the PFS pulses.

If 12-inch page length sheet is used in this printer 100, some additional arrangements may also be considered such that the last page carrying an unfixed toner image is discharged when the printing is terminated, that the page remaining in the printer 100 is fed when printing is restarted, or that a perforated line is located at the fixing unit with the portion one inch from the next performation being located at the transfer unit 14.

Described as above, according to the present invention, the period of time in which the temperature of the heat roller can be raised to the fixing range in a relatively short period after the end of printing can be made longer. Accordingly, even if the temperature of the heat roller is frequently switched between the fixing range and the standby range, the warm-up time for raising the temperature of the heat roller to the fixing range is made short.

The present disclosure relates to subject matters contained in Japanese patent applications No. HEI 1-293712 (filed on Nov. 10, 1989) and No. HEI 2-98221 (filed on Apr. 11, 1990) which are expressly incorporated herein by reference in their entireties.

What is claimed is:

1. A temperature control system employed in a electrophotographic printer for controlling the temperature of a heat roller, said temperature control system comprising:

switching means for switching the setting of the temperature of said heat roller between an operable range and a standby range, the temperature of said heat roller being held in said operable range when printing is executed, while the temperature of said heat roller is held in said standby range, which is lower than said operable range, when printing is not executed;

select means for selecting said operable range or said standby range; and control means for raising the temperature of said heat roller to the upper limit of said operable range before the temperature of said heat roller is lowered to said standby range when said standby range is selected by said select means.

2. The temperature control system according to claim 1, wherein said control means comprises discrimination means for discriminating whether the temperature of said heat roller reaches the upper limit of said operable range within a predetermined period of time after said standby means is selected by said select means.

3. The temperature control system according to claim 2, wherein said control means further comprises means for preventing the temperature of said heat roller from being continuously kept in said operable range over a predetermined maximum period of time, whereby the temperature of said heat roller is lowered after said switching means has been actuated continuously for said predetermined period of time.

4. An electrophotographic printer in which a toner image is fixed onto a recording medium by means of a heat roller, said printer comprising:

switching means for switching the setting of the temperature of said heat roller between an operable range and a standby range, the temperature of said heat roller being held in said operable range when printing is executed, while the temperature of said heat roller is held in said standby range, which is lower than said operable range, when printing is not executed;

select means for selecting said operable range or said standby range; and control means for raising the temperature of said heat roller to the upper limit of said operable range before the temperature of said heat roller is lowered to said standby range when said standby range is selected by said select means.

5. The printer according to claim 4, wherein said control means comprises discrimination means for discriminating whether the temperature of said heat roller reaches the upper limit of said operable range within a predetermined period of time after said standby means is selected by said select means.

6. The printer according to claim 5, wherein said control means further comprises means for preventing the temperature of said heat roller from being continuously kept in said operable range over a predetermined maximum period of time, whereby the temperature of said heat roller is lowered after said switching means has been actuated continuously for said predetermined period of time.

7. A temperature control system employed in a electrophotographic printer for controlling the temperature of a heat roller, said temperature control system comprising:

first means for keeping the temperature of said heat roller in a predetermined operable range, said first means being actuated when printing is executed;

second means for keeping the temperature of said heat roller in a predetermined standby range, said second means being actuated when printing is not executed, the temperatures of said standby range being lower than said operable range; and control means for raising the temperature of said heat roller up to the upper limit of said operable range before said first means is switched to said second means when printing is terminated.

8. The temperature control system according to claim 7, wherein said first means comprises discrimination means for discriminating whether the temperature of said heat roller reaches the upper limit of said operable range within a predetermined period of time after said first means is actuated.

9. The temperature control system according to claim 8, wherein said first means comprises means for preventing the temperature of said heat roller from being continuously kept in said operable range over a predetermined maximum period of time, whereby the temperature of said heat roller is lowered after said first means has been actuated continuously for said predetermined period of time.

10. An electrophotographic printer in which a toner image is fixed onto a recording medium by means of a heat roller, said printer comprising:

first means for keeping the temperature of said heat roller in a predetermined operable range, said first means being actuated when printing is executed;

second means for keeping the temperature of said heat roller in a predetermined standby range, said second means being actuated when printing is not executed, the temperatures of said standby range being lower than of said operable range; and control means for raising the temperature of said heat roller up to the upper limit of said operable range before said first means is switched to said second means when printing is terminated.

11. The printer according to claim 10, wherein said first means comprises discrimination means for discriminating whether the temperature of said heat roller reaches the upper limit of said operable range within a predetermined period of time after said first means is actuated.

12. The printer according to claim 11, wherein said first means comprises means for preventing the temperature of said heat roller from being continuously kept in said operable range over a predetermined maximum period of time, whereby the temperature of said heat roller is lowered after said first means has been actuated continuously for said predetermined period of time.

13. A temperature control system for use in an electrophotographic printer for controlling the temperature of a heat roller, said temperature control system comprising:

means for switching the temperature of said heat roller between a predetermined printing range and a predetermined non-printing range, wherein said non-printing range is lower than said printing range;

means for raising the temperature of said heat roller towards an upper limit of said printing range before the temperature of said heat roller is lowered to said non-printing range when said heat roller is switched to said non-printing range by said switching means.

* * * * *

UNITED STATES PATENT AND TRADEMARK OFFICE
CERTIFICATE OF CORRECTION

PATENT NO. : 5,109,255
DATED : April 28, 1992
INVENTOR(S) : T. NISHIKAWA et al.

It is certified that error appears in the above-indentified patent and that said Letters Patent is hereby corrected as shown below:

On title page, item [75] Inventors,
change "Tomoyuki Nishikawa, Matsudo; Masahiro Kita, Tokyo; Takaai Yano, Kawagoe; Tatsuya Yoshida, Shimooshi; Ryoji Honda, Asaka; Kiyoshi Negishi, Tsurugashima; Tsutomu Sato, Tokyo; Shoji Kamasako, Tsurugashima, all of Japan" to ---Tomoyuki Nishikawa, Chiba-Ken; Masahiro Kita, Tokyo; Takaai Yano, Saitama-Ken; Tatsuya Yoshida, Saitama-Ken; Ryoji Honda, Saitama-Ken; Kiyoshi Negishi, Saitama-Ken; Tsutomu Sato, Tokyo; Shoji Kamasako, Saitama-Ken, all of Japan---; and
On title page, item [57] Abstract, line 7, change "unexecuted" to ---not executed---.

Signed and Sealed this

Sixteenth Day of August, 1994

Attest:

BRUCE LEHMAN

Attesting Officer

Commissioner of Patents and Trademarks